March 25, 1947. J. T. OVERSTREET 2,417,884
PISTON RING
Filed Aug. 8, 1944
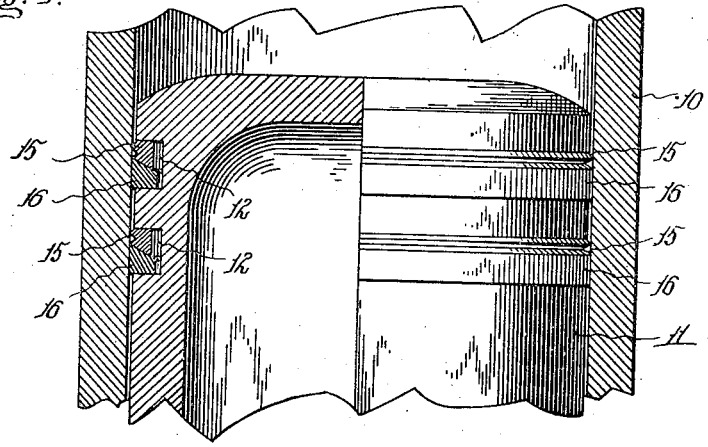
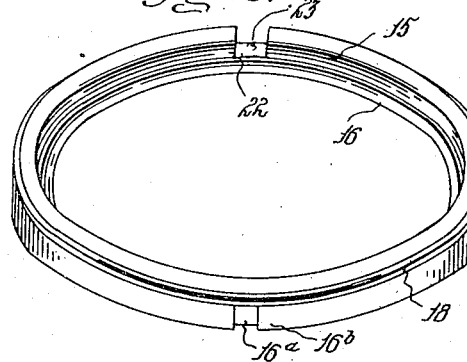
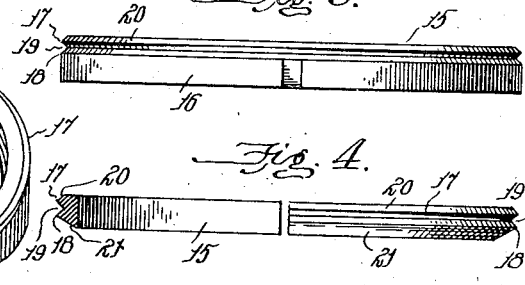
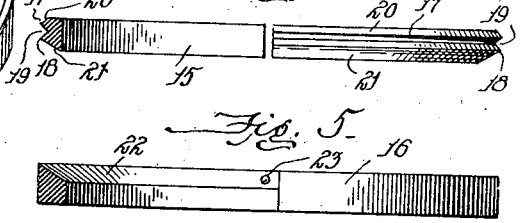
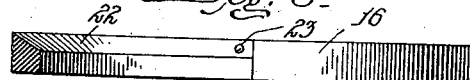
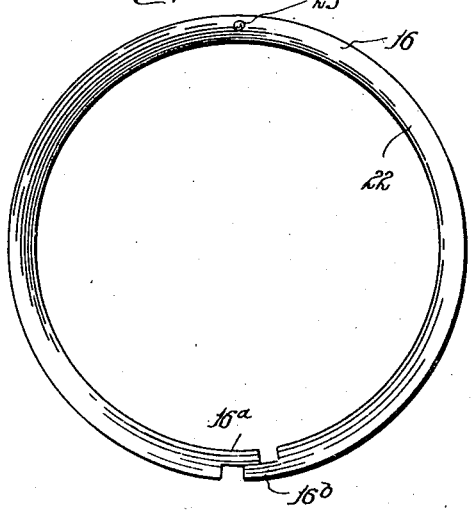
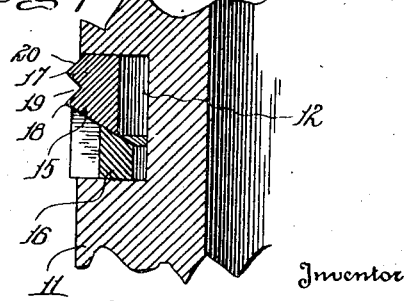
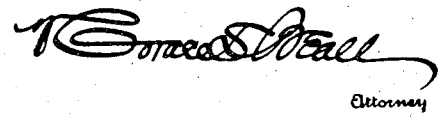
Inventor
John T. Overstreet.
Attorney Patented Mar. 25, 1947

2,417,884

UNITED STATES PATENT OFFICE 2,417,884

PISTON RING

John T. Overstreet, South Antonio, Tex.

Application August 8, 1944, Serial No. 548,529

2 Claims. (Cl. 309—44)

My invention is an improvement in piston rings especially adapted for use in connection with internal combustion engines, and relates to that particular type in which the piston ring comprises two annular strips of metal, or individual rings, mounted one upon the other for slidable movement on each other.

In the contemplation of a piston ring of this general type the important desideratum has been to provide for the proper oiling of the rings and grooves in which they work, with particular reference to preventing escape of the lubricating oil to the upper part of the cylinder as well as confine the explosive gases to this part of the cylinder, in some instances the two parts of the ring having their meeting edges disposed at a downward inclination for better engagement of the compound ring with the wall of the cylinder.

Appreciating the advantages of a two-part piston ring of the general character mentioned, my invention seeks to so improve the formation of the companion parts or sections of the ring as to bring about a more reliable operation by a particular construction of the two parts for coordination with respect to each other and with the groove in the piston in which they work, and to this end my invention consists in the peculiar construction of the compound piston ring by which are provided effective oil grooves in combination with contact edges that will overcome leakage.

In the drawings:

Figure 1 is an elevation, partly in section, showing the application of my improved form of piston ring to an engine cylinder and piston.

Fig. 2 is a detail perspective view of a piston ring in accordance with my invention.

Fig. 3 is a side elevation thereof.

Figs. 4 and 5 are side elevations of the upper and lower sections of the ring, separated.

Fig. 6 is a plan view of the lower section of the piston ring, and

Fig. 7 is a sectional view, enlarged, of the piston ring, including fragmental portions of a cylinder and piston.

My improved construction of piston ring is usable in connection with any piston for ordinary purposes, and inasmuch as it is especially adapted for internal combustion engines I have illustrated this application of the same in Fig. 1, in which 10 designates the cylinder, 11 the piston, and 12, 12, the rectangular grooves to receive the piston rings, each groove being of the required width and depth to accommodate the ring. In the present instance the groove is of a greater width than depth so that it will cooperate with the formation of the compound ring constructed in accordance with my invention, and in which the two parts of said ring have bearing in the groove between the upper and lower walls 13, 14 thereof.

The two parts or sections, 15, 16, constituting my improved piston ring, are in the form of separate circular strips of spring metal, as steel, mounted one upon the other with the contiguous ends of each strip or split ring disposed at opposite sides of the compound ring to break joint, as usually practised, and following out this general type of piston ring the meeting edges of the two parts are at a downward inclination rearwardly so that either one or both parts will have a greater tendency to spring outwardly against the wall of the engine cylinder.

In carrying out my invention it is the upper section or individual ring 15 to which I have given particular attention, whereby in the formation of this ring the circumference thereof, which contacts with the cylinder wall, is provided with spaced apart outwardly projecting peripheral edges 17, 18, defined by an inter medial V-shaped groove 19 in addition to a beveled outer edge 20 and a beveled lower edge 21, the lower beveled edge extending the full width of the ring to cooperate with the upper beveled edge of the companion ring section 16. This formation of the circumference of the upper ring section is very effective in not only preventing leakage of the lubricating oil and gases around the ring but also cooperates with the two-part piston ring as a whole trap the required amount of oil in effecting a proper lubrication between the piston and cylinder of the engine.

As will be noted by reference to the drawings, the squared ends of the spring metal strip forming the upper section or individual ring are spaced wide apart, or wider than usual, so that the compression in the upper part of the cylinder will enter between said ends and thereby increase the expansion of the ring for a closer fit in the cylinder, the lower section or ring closing this gap. Likewise the spaced apart ends of the lower individual ring increase the expansion of this ring, in this instance there being a lap-joint, as hereinafter explained. Furthermore, with reference to the particular construction of the circumference or engaging edges of the upper ring, the beveled upper edge, leading to the engaging edge 17, serves to keep the oil from collecting above the piston ring to cause oil pumping in internal combustion engines.

The other section or individual ring, 16, is substantially rectangular in cross-section, the exception being that the surface, 22, thereof is disposed at an inclination downward and rearward to cooperate with the corresponding edge of the upper section or ring 15. The lower ring or circular metal strip is reduced at its ends, as at 16ª, 16ᵇ, to provide a lap joint in contradistinction to the squared ends of the upper ring section, and in providing this lap joint the ends and respective shoulders are cut in the arc of a circle to augment the expansion of the ring section. This ring section is also provided with means for preventing the sections from creeping one upon the other, that is to say, to maintain the joints at opposite sides of the composite piston ring, such means in the present instance being a lug 23, applied to the ring in the form of a lump of copper welded in place at a point opposite the lap joint to properly space the joints of the two rings composing the piston ring.

From the foregoing description of my invention, in connection with the drawings, the construction and advantages will be readily understood by those skilled in the art, and what I claim as new, and desire to protect by Letters Patent is specifically set forth in the appended claims.

I claim:

1. A piston ring for internal combustion engines comprising two associated resilient ring sections one above the other with inclined meeting surfaces for lateral sliding movement in respect to each other, and in which the upper ring section is provided with adjoining outwardly projecting triangular shape ribs having the inclined surfaces of each extending in opposite directions rearward from the outer edge and the contiguous inclined surfaces of the adjoining ribs forming the side walls of an intermediate oil pocket while the outer edges of the ribs engage the cylinder wall of the engine.

2. A piston ring for internal combustion engines comprising two associated resilient ring sections one above the other with inclined meeting surfaces for lateral sliding movement in respect to each other, and in which the upper ring section is provided with adjoining outwardly projecting ribs triangular in cross-section with the inclined surfaces of each extending in opposite directions rearward from the outer edge, the contiguous inclined surfaces of the adjoining ribs forming the side walls of an intermediate oil pocket while the outer edges of the ribs engage the cylinder wall of the engine and the downwardly inclined surface of the upper rib extends from the upper edge of the ring section to prevent oil collecting above the piston ring.

JOHN T. OVERSTREET.

REFERENCES CITED

The following references are of record in the file of this patent:

UNITED STATES PATENTS

| Number | Name | Date |
| --- | --- | --- |
| 1,426,072 | Hanson | Aug. 15, 1922 |
| 1,860,025 | Good | May 24, 1936 |
| 2,299,399 | Lane | Oct. 20, 1942 |
| 1,813,792 | Wuerfel | July 7, 1931 |
| 1,129,910 | Small | Mar. 2, 1915 |
| 1,336,670 | Anderson | Apr. 13, 1920 |
| 1,544,804 | Byrn | July 7, 1925 |
| 2,068,115 | Solenberger | Jan. 19, 1937 |